United States Patent [19]
Pollard

[11] 3,723,816
[45] Mar. 27, 1973

[54] CURRENT LIMITING STATIC SWITCH
[75] Inventor: Ernest M. Pollard, Cherry Hill, N.J.
[73] Assignee: General Electric Company
[22] Filed: Jan. 21, 1972
[21] Appl. No.: 219,621

[52] U.S. Cl..............317/20, 317/335 C, 317/23, 323/24, 307/252 P, 307/252 Q, 317/50
[51] Int. Cl. ........................................H02h 3/08
[58] Field of Search .........317/33 SC, 20, 23, 50; 307/252 M, 252 N, 252 P, 252 Q, 284; 321/45 C; 323/24

[56] References Cited

UNITED STATES PATENTS

| | | | |
|---|---|---|---|
| 3,102,226 | 8/1963 | Borkovitz | 323/24 X |
| 3,133,209 | 5/1964 | Greenwood | 307/252 M |
| 3,558,983 | 1/1971 | Steen | 317/33 SC |

Primary Examiner—William M. Shoop, Jr.
Assistant Examiner—Harvey Fendelman
Attorney—J. Wesley Haubner et al.

[57] ABSTRACT

Disclosed is a bidirectional current limiting static circuit breaker including four power thyristors arranged to form two conducting paths. Each path includes two of the thyristors and a common current limiting inductor. Commutation means are provided to render any fault current carrying power thyristors non-conductive upon command. The current limiting inductor acts to insure that commutation proceeds to a successful conclusion once begun. The breaker also includes means for suppressing commutation induced transients and for protecting nonconducting power thyristors from externally originated voltage surges.

9 Claims, 1 Drawing Figure

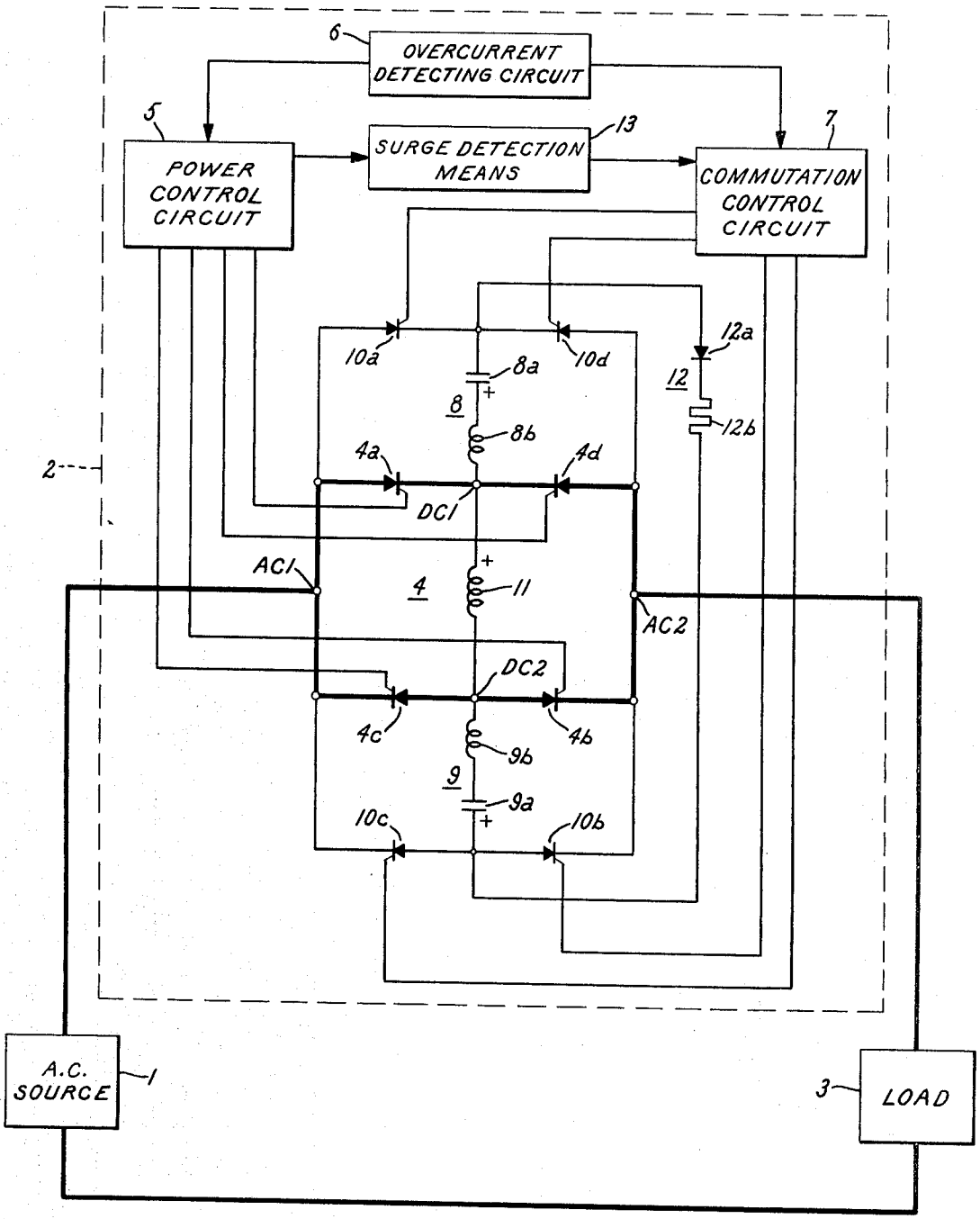

CURRENT LIMITING STATIC SWITCH

BACKGROUND AND OBJECTS OF THE INVENTION

This invention relates to forced commutated static switches which are adapted to be connected to an electric power circuit for selectively permitting or blocking the flow of alternating current therein. More particularly, this invention relates to an AC switch composed of serially connected thyristors, associated commutation circuits selectively operative for interrupting current through the switch, means for expediting the commutation process, and voltage surge suppression means.

In the art of electric power distribution and utilization, it is a common practice to employ switches or circuit breakers in order to initiate or terminate the flow of load current on command from a control circuit. These switches may advantageously be constructed of solid state controllable switching devices such as thyristors. A silicon controlled rectifier (SCR) is one type of thyristor useful in such switches. Since thyristor switches do not utilize any moving parts for circuit completion or interruption, they are known in the art as static switches. Static switches may be provided with overcurrent protective means to enable them to interrupt the flow of load current in response to a sensed overcurrent of a preselected magnitude.

As is well known, an SCR comprises a body of semiconductor material having a plurality of layers of alternately P and N type conductivities which form a plurality of back-to-back rectifying junctions therein. The semiconductor body is disposed between a pair of main electrodes, one known as the anode and the other known as the cathode. Thyristors additionally include some form of gating means (e.g., in a conventional SCR it is the gate electrode) which is operative for initiating current conduction between the anode and cathode. When connected to a source of voltage and a load, an SCR will ordinarily block appreciable current flow between its anode and cathode until triggered or fired by a signal to its gate electrode at a time when its anode is biased positive with respect to its cathode, whereupon it abruptly switches to a relatively low resistance conductive state. Once conducting, the SCR will continue to conduct load current even if no further triggering is provided, so long as the magnitude of current is above the predetermined holding level. When the magnitude of current drops below that level, the SCR switches to a relatively high resistance state whereupon the flow of load current is blocked until the SCR is subsequently retriggered. Therefore when connected to an AC power source an SCR will necessarily cease conducting at the occurrence of a natural current zero.

SCR's are unidirectional controlled switches, therefore in an AC power distribution system they are normally connected in an inverse parallel configuration to form a static switch having a pair of conducting paths (one path conducts positive or forward half cycles of load current and the other path conducts negative or reverse half cycles of load current). A control circuit is normally provided for supplying gate signals to the switch or power SCR's to initiate conduction therein. The control circuit includes means for effectuating load current interruption in response to a sensed fault or overcurrent. This may be accomplished by stopping the supply of gate signals from the control circuit, whereupon the switch or the power SCR's would commence blocking load current at the occurrence of the next natural current zero. It should be noted that this manner of current interruption may allow the fault current to build up to dangerous levels before the conducting switch regains its blocking state at the next current zero following the fault current's detection.

In order to provide current interruption capability within a fraction of a half cycle of the alternating source voltage, means must be provided to force the conducting power SCR off (i.e., return it to its blocking state). The process of turning off the conducting power SCR is known in the art as forced commutation or simply commutation. A static switch equipped with commutation means for interrupting current within a fraction of a half cycle of the detection of a fault is known as a current limiting switch. Such a switch limits the magnitude of the fault current to an acceptable maximum by interrupting the fault current early in its half cycle (i.e., before it reaches its peak magnitude).

The commutating means can take a variety of forms which are well known in the art. One commonly used commutation circuit comprises a charged capacitor connected in series with a thyristor (the thyristor is known in the art as a commutating thyristor, and the capacitor is known as a commutating capacitor). This circuit is connected in shunt across the power SCR of the static switch. The commutating thyristor is poled in the same direction as the power SCR and is normally in a nonconductive state. The commutating capacitor is charged to a predetermined DC voltage in opposition to the polarity of the power thyristor and is isolated from the power thyristor by the nonconducting commutating thyristor. When a fault current whose magnitude exceeds a preselected level is detected in the system, the commutating thyristor is triggered by its control circuit. This allows the charged commutating capacitor to discharge in the reverse direction through the conducting power thyristor. The commutating capacitor discharge serves to reverse bias the power thyristor and to drive the current flowing through it below its holding level, whereupon it turns off (resumes its blocking state).

For high voltage applications an AC switch may comprise plural power thyristors connected in series with one another to form each conducting path of the switch, whereby the full voltage imposed on the switch is divided or shared equally among the individual, lower voltage thyristors. In an AC switch wherein each conducting path is composed of a pair of serially connected power thyristors it has been suggested that the commutation function be provided either via a separate commutation circuit for each thyristor or via a common commutation circuit for each conducting path.

Insofar as the latter arrangement is concerned, care should be taken in constructing the switch to utilize in each path thyristors having substantially identical turn off characteristics. Otherwise the power thyristor which turns off first will be subjected in the reverse direction to the full voltage remaining on the commutating capacitor, and due to this excessive voltage stress the first off thyristor may eventually be degraded or permanently damaged. The necessity of matching turn off characteristics of mass produced thyristors so as to construct a switch that will successfully operate with only a single commutating circuit for each conducting path is expensive and time consuming.

By utilizing a separate commutating circuit for each of the seriesed thyristors in a conducting path, the necessity of precisely matching turn off characteristics is obviated. With this arrangement since the voltage on each commutating capacitor will not exceed a level that is compatible with the rating of its individually associated power thyristor, and even if one thyristor in a path turns off before the other, reverse voltage damage should not occur. For this reason a separate commutating circuit for each power thyristor in the conducting path is preferred, although such an arrangement requires extra commutating capacitors and commutating thyristors. From an economic standpoing it would be desirable to be able to construct a current limiting AC switch having both unmatched power thyristors and fewer commutating components.

Accordingly, it is a primary object of my invention to provide a relatively high voltage, current limiting, AC static switch utilizing a minimal number of commutating components while enabling the use of unmatched power thyristors.

In an AC static switch, either one (but not both) of the inversely poled load current paths may be conducting at the particular moment a fault or overcurrent is detected.

In order to ensure that commutation proceeds effectively if all of the commutating circuits are actuated at that time, it has been proposed in U. S. Pat. No. 3,558,983 (Steen) to use decoupling inductors connected between the respective paths and one end of the switch. This minimizes the forward bias effect on the conducting power thyristors of the discharge of the commutating capacitors associated with a nonconducting path. Another approach to ensuring that commutation proceeds successfully once it has begun is to actuate only the commutation circuits associated with the path that was actually conducting. Such a discriminating approach is shown and claimed in copending U. S. Pat. application Ser. No. 76,446 filed on Sept. 29, 1970 and assigned to the same assignee as my invention. While this saves the space and cost of at least the pair of decoupling inductors, it adds the complications and cost of load current direction discriminating and control circuitry.

Accordingly, it is a further object of my invention to provide a series-thyristor, current-limiting, AC switch including relatively simple and inexpensive means for ensuring successful commutation notwithstanding the fact that all of the commutating circuits are simultaneously actuated.

When thyristors switch from their conducting to their blocking states on the incidence of a current zero, voltage transients (hereinafter referred to as switching transients) are generated in the power circuit. In the case of a static switch being commutated off by the discharge of an associated commutating capacitor, the resulting switching transient appears on the commutating capacitor and is of opposite polarity to the voltage to which the capacitor was charged for its commutation duty. If the switching transient is large, damage to the commutating capacitor may result.

Accordingly, it is a further object of my invention to provide improved means coupled to a force-commutated-static switch for suppressing commutation-induced-voltage transients.

When connected in a power system a static switch may occasionally be subjected to an externally produced voltage surge (e.g., lightning striking a system conductor) at a time when the power thyristors are in their nonconducting state. If the surge is severe and if the power system lacks surge suppressing circuitry, some of the nonconducting power thyristors may be damaged.

Accordingly, it is yet a further object of my invention to provide means coupled to a forced commutated static switch which is effective for protecting the switch from externally generated voltage surges.

SUMMARY OF THE INVENTION

In accordance with one form of my invention I provide a bidirectional current limiting static switch. The switch is composed of four power thyristors connected in a bridge circuit including two conducting paths. One path, composed of two serially connected power thyristors, is adapted for carrying load current of positive polarity and the other path, composed of two other serially connected power thyristors is adapted for carrying load current of negative polarity. Commutation means are included in the switch to interrupt the flow of load current therethrough in response to a "stop" signal. The commutation means includes a normally nonconductive switch associated with each power thyristor and a pair of commutating capacitors. Each of said capacitors is associated with one power thyristor of one path and one power thyristor of the other path. When arranged in this manner, each capacitor is adapted for supplying commutating energy to two power thyristors. In order to ensure that commutation proceeds successfully in the event that all of the commutating switches become conductive, current limiting impedance means is provided in the switch. The impedance means is connected between the power thyristors in such a manner that it is included in each conducting path.

A switching transient suppressing circuit, which is also effective for protecting the switch power thyristors from externally generated voltage surges, is provided in shunt across the commutation capacitors and the current limiting impedance means.

BRIEF DESCRIPTION OF THE DRAWING

This invention will be better understood and its various objects and advantages will be more fully appreciated from the following description taken in conjunction with the accompanying drawing which is a schematic diagram of a power system utilizing a static switch in accordance with my invention.

DETAILED DESCRIPTION OF THE PREFERRED EMBODIMENT OF THE INVENTION

As can be seen an alternating voltage source 1 is arranged to supply electric power to a load 3. In order to initiate or terminate the flow of current to the load, a static circuit breaker 2 is provided between the source and the load. This circuit breaker includes a solid state or static switch 4. Although only a single-phase switch is shown, it will be understood that two more duplicate switches would be used in a typical 3-phase static breaker. In order to control conduction of the static switch, i.e., initiate or terminate current conduction therein, the breaker also includes a power control circuit 5 having two states or modes, namely "ON" and "OFF." When control circuit 5 is actuated from its ON to its OFF states the static switch interrupts the flow of current to the load. Further, the breaker includes commutation means to force commutate the static switch in high-speed response to the detection of a fault current by an overcurrent detecting circuit 6. The commutation means are controlled by a commutation control circuit 7.

The static switch 4 comprises four power thyristors 4a, 4b, 4c and 4d connected in a bridge circuit to provide a switch having a bidirectional load current conduction capability. As can be seen the anode of thyristor 4a is connected to the cathode of thyristor 4c at one AC terminal, AC1, of the switch. In a similar manner the anode of thyristor 4d is connected to the cathode of thyristor 4b at the other AC terminal, AC2, of the switch. The cathodes of thyristors 4a and 4d are connected together at one DC terminal, DC1, of the switch and the anodes of thyristors 4c and 4b are connected at the other DC terminal, DC2, of the switch. When arranged in this manner thyristors 4a and 4b form one conducting path and thyristors 4c and 4d form a second conducting path. As should be appreciated one conducting path is adapted for conducting current of positive polarity to the load and the other path is adapted for conducting current of negative polarity thereto. Since each path includes two serially connected power thyristors, the switch is particularly adapted for use in high voltage circuit breaking applications. For higher current ratings, the individual thyristors shown can be respectively paralleled by duplicate devices which operate in unison therewith. Respective voltage dividing bypass circuits are connected in shunt with each serially connected power thyristor. Such circuits are sometimes referred to as "snubber circuits" and commonly include a resistor connected in series with a capacitor. For the sake of drawing simplicity the snubber circuits included in the static switch 4 are not shown.

Control circuit 5, in its ON mode, provides suitable gate signals to the power thyristors making up switch 4 to render the switch conductive, whereupon load current is able to flow between the source 1 and the load 3. In its "OFF" mode no gate signals are provided by control circuit 6 to any of the switch power thyristors. Hence, when control circuit 6 is in this mode the static switch 4 blocks the flow of load current.

Static circuit breaker 2 is of the current limiting type and is therefore equipped with means for rapidly forcing all conducting power thyristors OFF in response to a sensed fault. That means includes a pair of commutation circuits 8 and 9. Commutation circuit 8 includes a capacitor 8a and an inductor 8b and is connected at one end to a DC terminal of the bridge circuit. In a similar manner commutation circuit 9 includes a capacitor 9a and an inductor 9b and is connected at one end to the other DC terminal of the bridge circuit. A normally nonconductive commutating thyristor 10a is connected between one AC terminal of the bridge circuit and one end of the commutation circuit 8. A normally nonconductive commutating thyristor 10d is connected between the other AC terminal of the bridge circuit and the end of the commutating circuit 8. In a similar manner a normally nonconductive commutating thyristor 10c is connected between one AC terminal of the bridge circuit and one end of the commutation circuit 9. Another nonconductive commutating thyristor 10b is connected between the other AC terminal of the bridge and one end of the commutation circuit 9. When connected in this manner each power thyristor has associated with it a similarly poled commutating thyristor. Capacitor 8a of commutating circuit 8 and capacitor 9a of commutating circuit 9 are charged to a DC voltage level, the polarity of which is shown. Although not shown in the drawing, use of a precharging scheme such as that claimed in U. S. Pat. No. 3,098,949-Goldberg is contemplated.

When a fault occurs, current flowing in the switch increases abnormally. When the magnitude of fault current attains a preselected level, overcurrent detecting circuit 6 is activated and immediately provides a "stop" signal to the power control circuit 5 and to the commutation control circuit 7. Upon receipt of a stop signal, control circuit 5 ceases producing gate signals for the power thyristors. In response to the same event, commutation control circuit 7 is arranged to supply a gate signal to all of the commutating thyristors.

If the fault current is large, irrespective of which conducting path is carrying that current, a voltage of the polarity shown will appear on inductor 11 and will be of sufficient magnitude to reverse bias the commutating thyristors associated with the nonconducting power thyristors. This action will prevent those commutating thyristors from becoming conductive notwithstanding the application of the trigger signals thereto from control circuit 7. For example, assume that fault current is flowing through the conductive path made up of power thyristor 4a, inductor 11 and power thyristor 4b and attains a preselected level. Overcurrent detecting circuit 6 feeds a stop signal to power control circuit 5 and commutation control circuit 7, and the latter circuit provides trigger signals to the gates of all of the commutating thyristors. If the fault current is high enough, the voltage appearing on inductor 11 will reverse bias commutating thyristor 10d and 10c notwithstanding the fact that the commutating capacitor connected to each of them will tend to forward bias them. Commutating thyristors 10a and 10b will now begin conducting, and commutation of the conducting power thyristors 4a and 4b will occur in the following manner: the energy stored in commutating capacitor 8a will be enabled to flow in the reverse direction through power thyristor 4a via conducting commutating thyristor 10a. In a similar manner the energy stored in commutating capacitor 9a will be enabled to flow in the reverse direction through power thyristor 4b via commutating thyristor 10b. The reverse current flowing through the power thyristors quenches load current conduction therein. Due to the fact that each commutating circuit contains an inductor (i.e., commutating circuit 8 includes inductor 8a and commutating circuit 9 includes inductor 9a) the current flowing through the conducting commutating thyristors is oscillatory in nature and at the occurrence of the current zero the commutating thyristors cease conducting and the flow of load current is terminated.

As should be appreciated, the magnitude of the voltage appearing on inductor 11 as fault current flows therethrough is a function of the rate of rise of that current ($di/dt$). In certain situations the $di/dt$ may be relatively small so that the voltage appearing on inductor 11 may be insufficient to reverse bias the commutating thyristors associated with the nonconducting power thyristors (i.e., the voltage appearing on inductor 11 may be less than the voltage on capacitors 8a and 9a). Accordingly, all the commutating thyristors may begin conducting upon receipt of trigger signals from the commutation control circuit 7. In the interest of successful commutation of the fault current carrying power thyristors, it is important that the energy discharging from the capacitors of the commutating circuits be delivered in the reverse direction through the conducting power thyristors. In that regard it is of utmost importance to prevent the commutating capacitor discharge current from circulating around circuit paths including conducting commutating thyristors but excluding the conducting power thyristors (one such path consists of commutating thyristor 10a, commutating capacitor 8a, commutating inductor 8b, current limiting inductor 11, commutating inductor 9b, commutating capacitor 9a, and commutating thyristor 10c, and a second such path consists of commutating thyristor 10d, commutating capacitor 8a, commutating inductor 8b, current limiting inductor 11, commutating inductor 9b, commutating capacitor 9a and commutating thyristor 10b).

The current limiting inductor 11 serves to prevent the discharge current from the commutating capacitors from circulating in those paths at least until the fault current carrying power thyristors have turned off. In so doing the current limiting inductor ensures that commutation of the fault current carrying power thyristors can proceed to a successful conclusion irrespective of whether or not the commutating thyristors associated with a nonconducting power thyristor become conductive. The operation of the inductor in this respect will be described with reference to the commutation of power thyristor 4a (assuming that the fault current is flowing through thyristors 4a and 4b and that all of the commutating thyristors turn on upon being triggered by the commutation control circuit 7). When commutating thyristor 10a is triggered, current begins flowing from commutating capacitor 8a in the reverse direction through power thyristor 4a via the path consisting of the conducting commutating thyristor 10a, commutating capacitor 8a, commutating inductor 8b and power thyristor 4a. At the same time the current flowing through conducting power thyristor 4a in the forward direction includes not only the fault current but also includes current from discharging commutating capacitor 9a. The latter current is enabled to flow via conducting commutating thyristor 10c (it flows through the path consisting of commutating thyristor 10c, power thyristor 4a, current limiting inductor 11, commutating inductor 9b and commutating capacitor 9a). The inductance of each commutating inductor 8a and 9a is smaller than the inductance of current limiting inductor 11 (e.g., inductor 11 has approximately 10 times the inductance of inductor 8a and inductor 9a).

Therefore, the current flowing in the reverse direction through the conducting power thyristor 4a (i.e., the current from commutating capacitor 8a) encounters less impedance than the current flowing in the forward direction therethrough (i.e., the relatively slow rising fault current and the current from commutating capacitor 9a which must traverse the relatively large current limiting inductor 11), and the net forward current is rapidly reduced. This action results in the quenching of current flow through power thyristor 4a. Once power thyristor 4a ceases conducting the remaining discharge current from the commutating capacitors can flow through the path including commutating thyristors 10a and 10c, current limiting inductor 11 and commutating circuits 8 and 9. Due to the inductance in this path the current is oscillatory in nature and at the occurrence of the current zero the commutating thyristors cease conducting and the flow of fault current is terminated. It should be appreciated that in the above example power thyristor 4b would be commutated off in a similar manner. Whether all commutating thyristors turn on or only those associated with the fault current conducting power thyristors turn on, the commutation sequence is completed within a few hundred microseconds from the time the fault of a preselected magnitude is sensed. Therefore, the fault current which is permitted to flow can be limited to an acceptable magnitude, (i.e., well below the available peak fault current magnitude) by the very rapid response of the static circuit breaker 2.

The static switch 2 also includes common circuitry effective for protecting the commutating capacitors from switching-created-voltage-surges and for protecting nonconducting power thyristors from externally produced voltage surges.

As is known, when a power thyristor switches from its conducting to its nonconducting state, a voltage transient is generated. This transient will appear across the commutating capacitor associated with the power thyristor which is turning off and will be of opposite polarity to the normal voltage on the commutating capacitor. If the magnitude of the switching transient is large, damage to the commutating capacitor or to the power thyristor may result.

As can be seen in the drawing a surge suppressing circuit 12 is connected between the common points of commutating thyristors 10a and 10d and the common point of commutating thyristors 10c and 10b. The circuit 12 includes a unipolarity conducting element or diode 12a connected in series with an energy dissipating element or resistor 12b. The diode is poled in opposition to the polarity of the voltage normally appearing on the charged commutating capacitors so that the energy stored in those capacitors will not be diverted into the surge suppressing circuit during the process of commutation.

Operation of the surge suppressing circuit 12 will be considered below with regard to the commutation of power thyristor 4a. Absent the surge suppressing circuit, as thyristor 4a turns off (i.e., regains its blocking state), a switching voltage transient would appear on the discharging commutating capacitor 8a with reverse polarity compared to the initial charge. The transient is generated by the fault current switching to the conducting commutating thyristor. In flowing through the conducting commutating thyristor, the fault current tends to build up charge on the capacitor in the reverse direction. However, my surge suppressing circuit 12 effectively limits such a build-up of reverse voltage, and any excessive energy in the switching transient, instead of overstressing the commutating capacitor, will pass through diode 12a to resistor 12b to be safely dissipated therein.

The surge suppressing circuit 12 may also be used to protect the switch's power thyristors from externally generated voltage surges which might appear on the source side of the switch when it is in its OFF mode. As previously noted when the switch 2 is in its OFF mode all of the switches thyristors are in their blocking or nonconductive states. To effectuate surge suppression in this instance, I insert the circuit 12 into the path through which the surge will pass by triggering all of the commutating thyristors into conduction in response to the detection of the surge. To that end a surge detection means 13 is provided in the static circuit breaker coupled to the commutation control circuit 7 and the power control circuit 5. Such means causes the commutation control circuit to provide trigger signals to the commutating thyristors in response to the detection of a line surge above a preselected magnitude at a time when the power control circuit 5 is in its "OFF" mode. Insofar as external line surges are concerned operation of the surge suppressing circuit is as follows. Upon being triggered, the commutating thyristors begin conducting thereby forming two local current paths through which the energy stored in the commutating capacitors can circulate. One of such paths includes commutating thyristor 10a, commutating capacitor 8a, commutating inductor 8b, current limiting inductor 11, commutating inductor 9b, commutating capacitor 9a and commutating thyristor 10c. The other local path includes commutating thyristor 10d, commutating capacitor 8a, commutating inductor 8b, current limiting inductor 11, commutating inductor 9b, commutating capacitor 9a and commutating thyristor 10b. The circulation of the capacitor discharge current around both local paths effectively transfers the commutation capacitor energy to the current limiting inductor in the polarity shown. Furthermore, once all four commutating thyristors are conducting and capacitor discharge currents begin circulating in the local paths, the voltage appearing across the AC terminals of the switch is effectively zero (neglecting the slight voltage drops across the conducting commutating thyristors). Accordingly, the nonconducting power thyristors of the switch do not have to withstand the voltage surge and instead the surge is passed to the load.

Since each of the local paths includes inductance and capacitance, the current circulating therethrough is oscillatory in nature. At the occurrence of the natural current zero the commutating thyristors cease conducting and the circulating currents cease flowing. Now the energy stored in the current limiting inductor will begin discharging into the surge suppressing circuit where it is safely dissipated in resistor 12b.

It should be noted that in protecting the nonconducting power thyristors from external line surges the conduction of the commutating thyristors necessarily passes the surge to the load. Accordingly it is assumed that when a static circuit breaker is provided with such external voltage surge protecting means the load should be capable of absorbing such voltage surges, and if it is not capable of absorbing such surges additional protective circuitry (e.g., lightning arrestors) should be provided.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. For use in a power system including an AC power source and a load, a bidirectional switch for conducting current between the source and the load and for interrupting the flow of such current upon command, said switch comprising:
    a. first, second, third and fourth thyristors connected to form a bridge circuit having a pair of AC terminals and first and second DC terminals, each of said thyristors including an anode and a cathode, the cathodes of said first and third thyristors being connected in common to said first DC terminal, and the anodes of said second and fourth thyristors being connected in common to said second DC terminal;
    b. current limiting impedance means connected between said DC terminals, said impedance means together with said first and second thyristors forming a first load current conducting path between said AC terminals, said impedance means together with said third and fourth thyristors forming a second load current conducting path between said AC terminals;
    c. first energy storage means connected between said first DC terminals and a first point;
    d. second energy storage means connected between said second DC terminal and a second point; and
    e. first, second, third, and fourth controlled switch means adapted to be triggered upon command, said first and third switch means being connected to one another between said AC terminals with their juncture comprising said first point, and said second and fourth switch means being connected to one another between said AC terminals with their juncture comprising said second point.

2. The bidirectional switch as specified in claim 1 wherein said current limiting impedance means is an inductor.

3. The bidirectional switch as specified in claim 1 wherein each of said energy storage means is a capacitor.

4. The bidirectional switch as specified in claim 3 wherein said current limiting impedance means is an inductor.

5. The bidirectional switch as specified in claim 3 wherein each of said controlled switch means is a thyristor.

6. A bidirectional switch as specified in claim 1 wherein a surge suppressing circuit is connected between said first and said second points.

7. A bidirectional switch as specified in claim 6 wherein said power system includes means for detecting the presence of a voltage surge at a time when said bridge thyristors are nonconductive and for rendering said controlled switches conductive in response thereto.

8. The bidirectional switch as specified in claim 6 wherein said surge suppressing circuit comprises a unipolarity conducting element in series with an energy dissipating element.

9. Bidirectional switch as specified in claim 8 wherein said unipolarity conducting element is a diode and wherein said energy dissipating element is a resistor.

* * * * *